(12) United States Patent
Reijersen Van Buuren

(10) Patent No.: US 10,952,380 B2
(45) Date of Patent: Mar. 23, 2021

(54) BALER-WRAPPER COMBINATION WITH A MOVEABLE BALE SUPPORT AND BALE FORMING AND WRAPPING METHOD USING SUCH A COMBINATION

(71) Applicant: Forage Company B.V., Maassluis (NL)

(72) Inventor: Willem Jacobus Reijersen Van Buuren, Dirksland (NL)

(73) Assignee: Forage Company B.V., Maassluis (NL)

( * ) Notice: Subject to any disclaimer, the term of this patent is extended or adjusted under 35 U.S.C. 154(b) by 171 days.

(21) Appl. No.: 16/308,250

(22) PCT Filed: Jun. 1, 2017

(86) PCT No.: PCT/NL2017/050354
§ 371 (c)(1),
(2) Date: Dec. 7, 2018

(87) PCT Pub. No.: WO2017/213492
PCT Pub. Date: Dec. 14, 2017

(65) Prior Publication Data
US 2019/0174679 A1 Jun. 13, 2019

(30) Foreign Application Priority Data
Jun. 7, 2016 (NL) ...................... 2016907

(51) Int. Cl.
*A01F 15/07* (2006.01)
(52) U.S. Cl.
CPC ........ *A01F 15/071* (2013.01); *A01F 15/0705* (2013.01); *A01F 2015/074* (2013.01); *A01F 2015/0735* (2013.01)

(58) Field of Classification Search
CPC ........... A01F 15/071; A01F 2015/0735; A01D 2085/007; B65B 11/02; B65B 11/025;
(Continued)

(56) References Cited

U.S. PATENT DOCUMENTS 4,685,270 A * 8/1987 Brambilla ............... B65B 11/04
53/176
6,000,206 A * 12/1999 Case ....................... A01F 15/08
100/88
(Continued)

FOREIGN PATENT DOCUMENTS

CA 2081839 A1 5/1993
DE 3248066 A1 6/1984
(Continued)

OTHER PUBLICATIONS

European Patent Office, International Search Report for related International Application No. PCT/NL2017/050354, dated Aug. 25, 2017.

*Primary Examiner* — Stephen F. Gerrity
*Assistant Examiner* — Joshua G Kotis

(57) ABSTRACT

A baler-wrapper combination includes a bale forming device and at least one wrapping device with a bale support. The bale support being in the bale depositing position has a lateral offset to a vertical center plane of the bale forming device and is entirely positioned on one side of the vertical plane. A bale is moved on the bale support being in the bale receiving position and is wrapped. The wrapped bale is deposited from the bale support being in the bale depositing position on the ground.

21 Claims, 8 Drawing Sheets

(58) Field of Classification Search
CPC .............. B65B 27/125; B65B 2210/14; B65B 2210/16; B65B 2210/18; B65B 2210/20
USPC ...................... 53/203, 399, 461, 118; 56/341
See application file for complete search history.

(56) References Cited

U.S. PATENT DOCUMENTS

| | | | | |
|---|---|---|---|---|
| 6,341,470 | B1 * | 1/2002 | Lacey | A01F 15/071 |
| | | | | 53/176 |
| 6,679,035 | B1 * | 1/2004 | Viaud | A01F 15/071 |
| | | | | 53/118 |
| 7,043,892 | B1 * | 5/2006 | Kessler | A01D 84/00 |
| | | | | 56/341 |
| 2012/0137630 | A1 * | 6/2012 | McHale | A01F 15/071 |
| | | | | 53/167 |
| 2018/0020621 | A1 * | 1/2018 | Jones | A01F 15/0883 |
| | | | | 56/341 |
| 2018/0325033 | A1 * | 11/2018 | Borchers | B65B 11/025 |
| 2019/0098838 | A1 * | 4/2019 | Kraus | A01F 15/0833 |

FOREIGN PATENT DOCUMENTS

| | | | | |
|---|---|---|---|---|
| EP | 1 097 628 A1 | 5/2001 | | |
| EP | 2281436 A1 | 2/2011 | | |
| EP | 2 974 593 A1 | 1/2016 | | |
| EP | 3 014 979 A1 | 5/2016 | | |
| FR | 2 679 732 A1 | 2/1993 | | |
| KR | 101756441 B1 * | 7/2017 | ............. | A01F 15/07 |
| WO | 2013/014291 A1 | 1/2013 | | |
| WO | 2013/157949 A1 | 10/2013 | | |

* cited by examiner

BALER-WRAPPER COMBINATION WITH A MOVEABLE BALE SUPPORT AND BALE FORMING AND WRAPPING METHOD USING SUCH A COMBINATION

BACKGROUND

Field of the Invention

The invention refers to a baler-wrapper combination and to a method for forming and wrapping at least one bale by using at least one wrapping device with a movable bale support, in particular for forming a round-cylindrical bale from loose agricultural crop material and wrapping its entire surface into an impermeable film.

Description of Related Art

A baler-wrapper combination is in particular known for agricultural purposes. It is used when it is desired to form at least one bale from crop material picked-up from an agricultural field, to wrap the entire bale surface into an impermeable wrap, and to deposit the wrapped bale on the ground. Thanks to the impermeable web the deposited bale is isolated from the surrounding air and is protected from moisture.

Such an agricultural baler-wrapper combination is moved over ground and comprises a bale forming device and a wrapping device. The bale forming device provides a drum-shaped or cuboid bale forming chamber. Seen in the travelling direction of the baler-wrapper combination the wrapping device is mounted behind the bale forming device providing the bale forming chamber.

Such an agricultural baler-wrapper combination operates as follows:

Loose crop material is injected into the bale forming chamber, e.g. after the baler-wrapper combination has picked it up from the ground.

The bale forming device forms under pressure in the provided bale forming chamber from the injected crop material a bale, in general a round-cylindrical bale or a cuboid bale.

In the case of a round baler the cylindrical surface of the round-cylindrical bale is wrapped into a web of wrapping material while the bale is in the bale forming chamber. In the case of a cuboid bale several strands of twine are guided around the bale.

The formed and partially wrapped bale is ejected out of the bale forming chamber and is moved onto a bale support of the wrapping device behind the bale forming chamber. Thanks to the partial web the ejected bale does not fall apart. Often the bale support rotates the bale.

The wrapping device wraps the entire surface of the bale on the bale support into wrapping material. Typically an impermeable wrapping material, e.g. at least one web of plastic sheet, is used as the wrapping material. For wrapping the bale at least one holding device carrying a supply reel with wrapping material is moved with respect to the bale on the bale support, e.g. rotated around the rotated bale. Thereby at least one web of wrapping material is placed on the bale surface.

The bale support is tilted. The entirely wrapped bale rolls or glides from the bale support onto the ground.

Several proposals for such agricultural baler-wrapper combinations have been made as discussed below.

U.S. Pat. No. 6,679,035 B1

U.S. Pat. No. 6,679,035 B1 shows a baler at which a bale wrapping implement is attached. The bale wrapping implement includes a main frame which supports a bale wrapping or packaging arrangement. This arrangement comprises an angular wrapping arm support frame which supports a motor. The motor drives an output shaft to which a wrapping arm is coupled. The main frame comprises a first elongate frame component. The forward end of this frame component can pivot about the horizontal axis perpendicularly to the travelling direction. The second frame component is coupled via a pin to a pair of horizontal and vertically spaced plates. These plates receive a horizontal section of the wrapping arms support frame.

The horizontal section can rotate around the vertical pin. A pair of horizontal parallel rollers is mounted at the second frame component. These rollers can receive a bale delivered from the baler. For wrapping a bale the rollers can be rotated such that a bale resting on the rollers is rotated. The right-hand roller can slide along the second frame component such that the distance to the left-hand roller can be increased and the wrapped bale can be dropped on the ground.

An actuator has the form of a double-acting hydraulic piston-cylinder unit and comprises a cylinder and a piston rod. The cylinder end of the actuator is coupled to a horizontal projection which is mounted at the first frame component. The rod end of the actuator is coupled to a horizontal projection which is mounted at the lower horizontal section of the wrapping arm support frame. This lower section is connected through a link with the second frame component. This link is attached by a vertical pin to the lower section and by a further vertical pin to the second frame component. The first frame component is supported on the ground by a support wheel. A smaller further auxiliary support wheel usually does not touch the ground and is mounted at the second frame component.

During operation the actuator can move the frame of the bale wrapping implement between receiving position and a wrapping position. The frame is moved from the receiving position to the wrapping position by retracting the piston rod into the cylinder. By retracting and extending the piston rod the second frame component and the rollers can pivot about the pivot pins about 90 degrees.

EP1097628 A1

EP1097628 A1 discloses an agricultural combination comprising a tractor, a baler, and a bale wrapper apparatus. The combination is moved over a swath. The baler forms round-cylindrical bales from crop material of the swath and deposits them on the ground. The wrapper picks up the bales and wraps them. One embodiment described in EP1097628 A1, shows the longitudinal axis of the bale wrapping apparatus with a lateral offset to the general axis of the tractor and the baler. For achieving this offset the drawbar between baler and wrapper is hydraulically actuated. A wrapped bale is deposited with a lateral offset to the axis. Another embodiment described includes the longitudinal axis of the wrapper positioned angularly to the center axis.

CA 2081839 A1

CA 2081839 A1 shows a combination comprising a round bale winding apparatus which is attached to a bale press. The winding apparatus is connected via a connecting frame to corresponding counter bearing elements of the press. The press ejects a round bale. The ejected round bale rolls backward over a roller grid onto arms of a bale loading bracket. This bale loading bracket is arranged at the vehicle frame and can pivot around a pivot axis. The ejected bale is moved onto a winding table of the winding apparatus. This winding table comprises two drivable rollers which support the round bale which rolls on the bale loading bracket. The hydro-mover pivots the bale-loading bracket carrying the bale upwards. The pivotal movement of the bale loading bracket moves the round bale onto the tilted winding table. Later the winding table is pivoted backwards and to a horizontal position. In addition the bale loading bracket is further pivoted and the wrapped bale is deposited on the ground.

SUMMARY OF THE INVENTION

The invention described herein provides a baler-wrapper combination and a bale forming and wrapping method which provides more flexibility in selecting a bale depositing location without significantly decreasing the performance.

The baler-wrapper combination according to the invention comprises
- a bale forming device,
- at least one wrapping device, and
- at least one wrapper moving actuator.

Every wrapping device comprises a bale support arranged for carrying a bale to be wrapped.

The bale forming device
- provides a bale forming chamber,
- can form a bale in the provided bale forming chamber, and
- can eject the formed bale out of the bale forming chamber.

Every wrapping device is mechanically connected with the bale forming device. The respective bale support of the wrapping device is moveable with respect to the bale forming device. Thereby every moveable bale support can be moved between
- a bale receiving position and
- at least one lateral bale depositing position.

When a moveable bale support is in a lateral bale depositing position with respect to the bale forming device, the bale support has a lateral offset to a vertical center plane of the bale forming device. The entire bale support when in the lateral bale depositing position is on one side of the vertical center plane. In the case of a baler-wrapper combination belonging to a vehicle the vertical center plane is parallel to the travelling direction of the vehicle. Thanks to the lateral offset a horizontal distance between the bale support and the vertical center plane occurs. When the moveable bale support is in the bale receiving position, it is centered with respect to the vertical center plane.

At least one wrapper moving actuator can move at least one moveable bale support carrying a bale
- from the bale receiving position
- into the lateral bale depositing position.

Every wrapping device can remove a bale from its bale support when the bale support is in the bale depositing position.

The baler-wrapper combination when operated as follows performs the bale forming and wrapping method comprising the following steps:
- The bale forming device forms a bale in the provided baleforming chamber.
- The bale forming device ejects the formed bale out of the bale forming chamber.
- The ejected bale is moved onto the moveable bale support of a wrapping device. The bale support is in the centered bale receiving position while the bale is ejected.
- The wrapping device comprising the bale support, wraps the bale carried on the bale support into a web of wrapping material.
- A wrapper moving actuator moves the bale support carrying the bale from the centered bale receiving position into a lateral bale depositing position.
- The bale support and the carried bale are entirely on the same side of the vertical center plane, i.e. have a lateral offset when the bale on the bale support is entirely wrapped.
- The wrapping device removes the wrapped bale from the bale support when the bale support is in a lateral bale depositing position. Thereby the wrapped bale is deposited at a depositing location outside of the baler-wrapper combination, e.g. on the ground.

Advantages

According to the invention the baler-wrapper combination can move a bale which has been ejected out of the bale forming chamber onto a moveable bale support while the bale support is in the bale receiving position. As the bale receiving position is centered with respect to the vertical center plane, the bale can directly be moved onto the bale support. The corresponding wrapper moving actuator can move the bale support together with the carried bale from the bale receiving position into a lateral bale depositing position. Therefore it is not necessary to deposit an ejected bale onto the ground and later pick it up again and lift the bale onto the bale support. Thanks to the invention the combination can form and wrap the bale in one pass.

Often only some locations on a field are suitable for depositing a wrapped bale. Other locations are not suitable, e.g. due to a high inclination or a specific ground property at the location. A harvester should deposit a wrapped bale only on a suitable depositing location. According to the invention the wrapping device can deposit a wrapped bale when the bale support of the wrapping device is in a lateral bale depositing position. This feature increases flexibility when selecting a suitable bale depositing position on the ground. The bale depositing location can have a lateral offset with respect to the vertical center plane of the bale forming device in the moment of depositing the bale.

The invention makes it possible for the baler-wrapper combination to selectively wrap a bale on the bale support or not wrap the bale outside of the bale forming chamber before depositing the bale on the ground. When the bale is deposited without wrapping it outside of the bale forming chamber, the bale support is pivoted into the lateral bale depositing position before or while the bale is ejected out of the bale forming chamber. The bale forming device ejects the formed bale out of the bale forming chamber. The ejected bale passes the wrapping device having a lateral offset and is deposited on the ground. It is not necessary to move the bale through the wrapping device. The wrapping device does not form an obstacle for ejecting a bale out of the bale forming chamber and directly depositing it on the ground. It is possible that the baler-wrapper combination deposits at least two bales in a cluster on the ground, namely one bale from a bale support being in the lateral bale depositing position and one bale directly moved from the bale forming chamber onto the ground or from the bale forming chamber via a bale support in the center bale receiving position, onto the ground.

The baler-wrapper combination may also comprise two wrapping devices, one beside the other as seen in a viewing direction parallel to the center plane. Therefore, it is not necessary for the bale support of one wrapping device to be positioned above or behind the bale support of the other wrapping device.

The same baler-wrapper combination may selectively be operated with one or with two wrapping devices. The additional wrapping device can be mounted and demounted without rearranging the first, permanently mounted wrapping device.

It is possible but not necessary for an actuator to move a bale support carrying a bale upwards. An agricultural bale can have a weight of several hundred kilos. This upward movement would require movement of an object (bale support and bale) with a relatively high weight against the force of gravity and would therefore require a strong actuator. The wrapper moving actuator, however, only needs to move the bale support in a horizontal plane, i.e. parallel to the ground, and not against the force of gravity.

PREFERRED EMBODIMENTS

Preferably the baler-wrapper combination belongs to a vehicle which moves in a travelling direction over ground. This travelling direction is parallel to the vertical center plane of the bale forming device. Preferably the bale forming device can eject a formed bale out of the bale forming chamber in a direction parallel to the vertical center plane.

In one embodiment the bale support can only be moved between exactly two positions. In an alternative embodiment the bale support can selectively be moved into a first or further bale depositing positions. The selected bale depositing position may depend on an operating parameter, e.g. the weight of the bale on the bale support or the weight of a further bale in the bale forming chamber or a measured inclination of the baler-wrapper combination or the space available beside the baler-wrapper combination. It is possible that one bale depositing position is laterally offset from the vertical center plane and a further bale depositing position is centered with respect to this center plane.

In general the bale forming chamber is positioned between two vertical chamber planes which are both parallel to the vertical center plane. Preferably two lateral sidewalls of the bale forming chamber define these chamber planes. While a bale is formed in the bale forming chamber, the bale is positioned between the two chamber planes. In a preferred embodiment the bale support is in a lateral bale depositing position completely outside of the space between the chamber planes. This embodiment makes it even easier for the baler-wrapper combination to selectively move an ejected bale onto the bale support in the bale receiving position or directly to a depositing location on the ground. Preferably the ejected bale remains between the chamber planes and can pass by the bale support in the lateral bale depositing position. It is not necessary for the ejected bale to move through a wrapping device. Thereby a bale can selectively be wrapped by a wrapping device or can be deposited without being wrapped. It is possible to wrap one bale on the bale support in the lateral bale depositing position and simultaneously eject another bale without wrapping it.

According to the invention the respective bale support of a wrapping device is moveable between the bale receiving position and at least one lateral bale depositing position. Preferably the bale support can be moved into a position outside of the space between the chamber planes. One embodiment enables a bale to be moved from the bale chamber onto the moveable bale support of the wrapping device in the centered bale receiving position. When the bale support of the wrapping device is in a lateral bale depositing position entirely outside of the space between the parallel chamber planes, the bale forming device can eject a further bale out of the bale forming chamber. The ejected further bale remains in the space between the chamber planes and passes the bale support in the lateral bale depositing position. The further bale can selectively

- be moved onto a further bale support in a centered bale receiving position and wrapped by a further wrapping device or
- be deposited at a depositing location, e.g. on the ground, without being wrapped.

The further bale can be ejected while the first bale is wrapped by the wrapping device wherein the bale support is in the lateral bale depositing position. The feature that a bale support of one wrapping device can be moved into a bale depositing position outside of the chamber planes increases the throughput of the baler wrapper combination.

In one embodiment the respective bale support of a wrapping device may be pivoted with respect to the bale forming device between two or more positions. The wrapper pivoting axis for pivoting the bale support is preferably vertical, i.e. parallel to the vertical center plane. Preferably the wrapper pivoting axis has a lateral offset to the vertical center plane. It is also possible for at least one wrapper pivoting axis to be positioned outside of the space between the two parallel chamber planes.

In a further embodiment the respective moveable bale support of a wrapping device is shifted with respect to the bale forming device between two or more positions, i.e. a linear translation is performed. The shifting direction is perpendicular or angular to the vertical center plane and is preferably horizontal.

The preceding two embodiments can be combined, i.e. one bale support is moved from one position into another position by a superposition of a pivotal movement and a linear movement.

In one embodiment the baler-wrapper combination comprises two wrapping devices, namely a left and a right wrapping device. The terms "left" and "right" refer to a viewing direction from the wrapping devices towards the bale forming device and parallel to the vertical center plane, in the case of a vehicle, parallel to the travelling direction. The respective bale supports of both wrapping devices are moveable between at least two positions, namely a bale receiving position and a left or a right lateral bale depositing position, resp. Preferably the vertical center plane is positioned between the moveable bale supports, if both bale supports are in a respective bale depositing position.

The above embodiment enables the baler-wrapper combination to simultaneously wrap two or more bales and deposit the wrapped bales in a cluster at a depositing location, e.g. on the ground. A first bale is formed by the bale forming device and is moved onto the bale support of a first wrapping device (the left or right wrapping device being in the centered bale receiving position). The bale support of the first wrapping device carrying the first bale is later moved into a lateral bale depositing position. The first wrapping device wraps the first bale. Simultaneously or timely overlapping wrapping the first bale, a second bale is formed in the bale forming chamber. The formed second bale is moved onto the bale support of a second wrapping device (the right or left wrapping device) while the bale support of the first wrapping device is in the lateral bale depositing position and the bale support of the second wrapping device is in the centered bale receiving position. The bale support of the second wrapping device is moved into a bale depositing position while carrying the second bale. The second wrapping device wraps the second bale. Preferably both bales remain on the respective bale support until both bales are entirely wrapped and the baler-wrapper combination with the bale supports carrying the two bales reaches a suitable depositing location. Both bales are deposited at this suitable location.

Preferably the baler-wrapper combination can selectively wrap a bale by using a wrapping device and depositing the wrapped bale at a location outside of the combination, e.g. on the ground or at a further depositing location, or deposit a bale at a location without wrapping it by a wrapping device.

For depositing a bale without wrapping, the respective bale support of the wrapping device is moved into a respective bale depositing position—with or without carrying a bale. The bale which is not to be wrapped outside of the bale forming chamber is ejected out of the bale forming chamber and is moved to the depositing location and passes the wrapping device in a bale depositing position. It is also possible that a bale is moved onto a bale support in the bale receiving position and is later deposited from the bale support in a bale depositing position onto the ground without being wrapped.

In one embodiment a wrapping device comprises at least one wrapping material holding device. A web holding device holds a reservoir of wrapping material. For wrapping a bale on the bale support of the wrapping device a holding device is moved with respect to the carried bale. At least one web is pulled from the reservoir held by the holding device. In one implementation, a holder actuator moves a holding device with respect to the bale support, e.g. rotates it around the bale along a vertical axis. In another implementation, the bale support rotates the carried bale. Both implementations can be combined.

Preferably the holding device is entirely positioned on one side of the vertical center plane when the bale support is in a lateral bale depositing position and is positioned on one side of the center plane. Preferably the holding device and the bale support of the wrapping device are positioned outside of the space between the parallel chamber planes when the bale support is in the bale depositing position.

In one embodiment not only the bale support but the entire wrapping device can be moved between the bale receiving position and a lateral bale depositing position. This embodiment makes it possible for the wrapping device to begin to wrap a bale on the bale support while the wrapping device is in the bale receiving position. Therefore, moving the wrapping device into the bale depositing position and wrapping the bale on the bale support can be performed simultaneously or overlapping, thus saving time.

In a further embodiment only the bale support can be moved with respect to the bale forming device between the bale receiving position and a bale depositing position. A wrapping material holding device is preferably kept in a lateral position, i.e. in a position with a lateral offset to the vertical center plane, and when the bale support is in a bale receiving position. Preferably the bale support is moved towards the holding device when being moved into the bale depositing position. The wrapper moving actuator needs to move only the bale support and not the holding device, i.e. less parts are to be moved. In this embodiment the wrapping device preferably starts to wrap a bale on the bale support after the bale support has been moved into a bale depositing position.

In yet a further embodiment the wrapping device comprises a wrapper carrying device. The wrapper carrying device is connected to the bale forming device. The bale support is mounted at the wrapper carrying device and can be moved with respect to the wrapper carrying device into the bale receiving position and a bale depositing position. The wrapper moving actuator needs only to move the bale support with respect to the wrapper carrying device.

In one implementation the wrapping material holding device is mounted at the wrapper carrying device. In a further implementation the holding device is mounted at the bale support. The wrapper moving actuator moves the bale support with respect to the wrapper carrying device into two or more positions.

In one embodiment a bale transfer support bridges the distance between the bale forming device and a moveable bale support in the bale receiving position. An ejected bale is moved over the bale transfer support onto the bale support while the bale support is in the bale receiving position. The bale transfer support may be comprised of only passive parts, e.g. rollers, or may include an actively moved part, e.g. a pivotal bale transfer carrier onto which an ejected bale drops and a bale transfer actuator which pivots the bale transfer carrier away from the bale forming chamber towards the moveable bale support.

In one embodiment at least one ground-engaging wheel is mounted at the wrapper carrying device of a wrapping device. This embodiment increases the stability of the baler-wrapper combination, in particular when a bale is moved onto the bale support or when a bale support carrying a bale is moved from the bale receiving position to a lateral bale depositing position or when the combination is operated in a hilly environment.

In one embodiment the wrapper moving actuator first moves a bale support carrying an ejected bale from the centered bale receiving position to a lateral bale depositing position. The process of wrapping the bale on the moved bale support is started after the bale support has reached the lateral bale depositing position. This embodiment removes the need to move the bale support to a bale depositing position while the bale on the bale support is wrapped. The bale forming device can quickly eject a further bale.

In an alternative embodiment wrapping the bale on the bale support is started when the bale support is in the centered bale receiving position. The bale support is moved to a lateral bale depositing position while or after the bale is wrapped. This embodiment often increases stability as the bale support in the bale receiving position is behind the bale forming device in a centered position. In some implementations the width of the baler-wrapper combination is reduced while the bale support is in the bale receiving position. It is also possible to begin wrapping the bale on the bale support while the wrapper moving actuator moves the bale support from the bale receiving position into a bale depositing position.

These and other aspects of the invention and preferred embodiments will be even more apparent from the detailed description.

DETAILED DESCRIPTION

Figure 1:
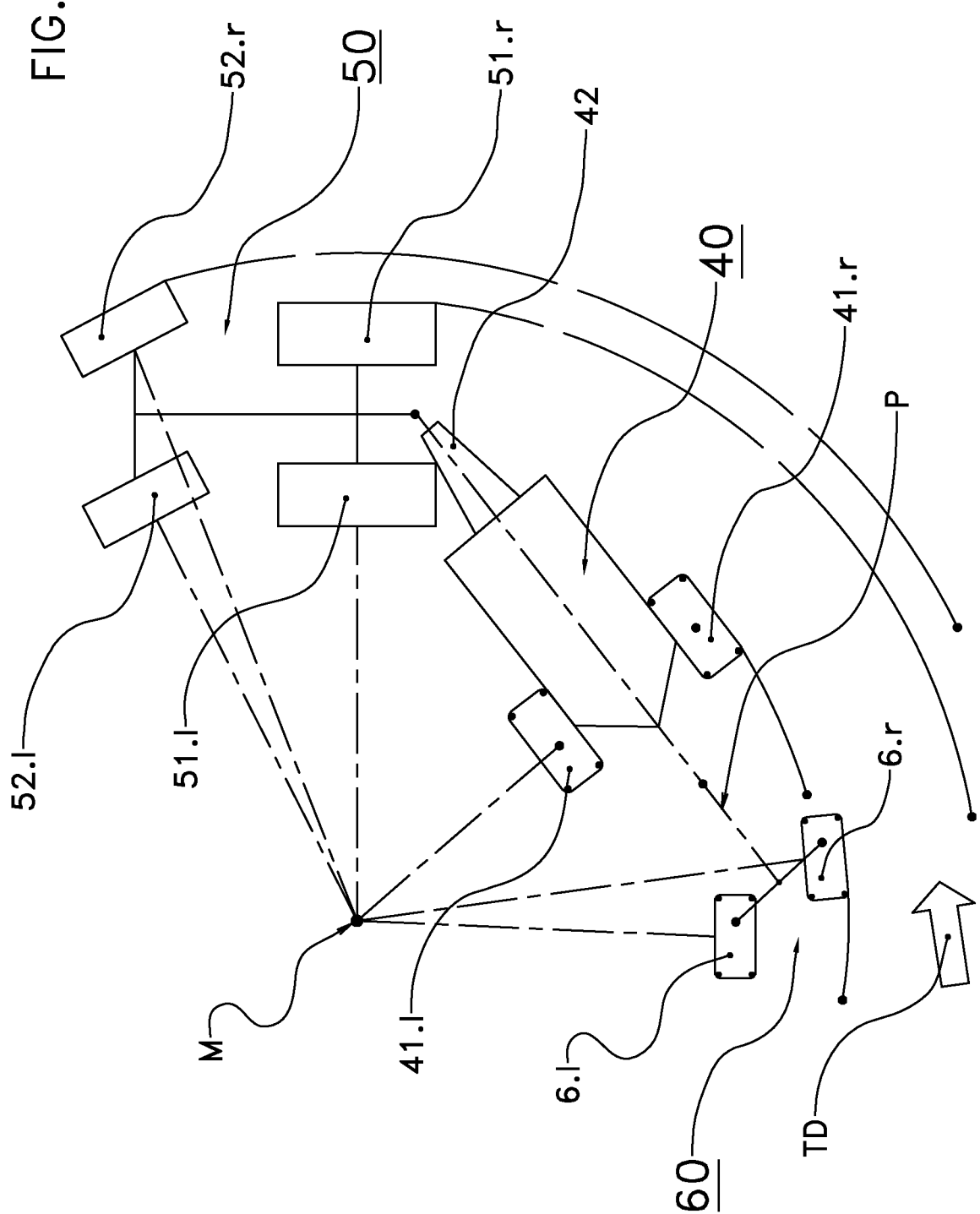
FIG. 1 is a top schematic view of a tractor and the pulled baler-wrapper combination driving through a curve.

FIG. 1 shows in a top view an agricultural combination driving along a curve to the left. The trajectory along which the combination is moved is a segment of a circle with the middle point M. The combination comprises
- a pulling tractor 50 with a driver cabin, a pair of steerable front wheels 52.*l*, 52.*r*, a pair of driven rear wheels 51.*l*, 51.*r*, and a tractor hitch and
- a baler-wrapper combination according to the invention.

The baler-wrapper combination of the embodiment comprises
- a bale forming device 40 with a towing unit 42 and two ground-engaging wheels 41.*l*, 41.*r*,
- a wrapping arrangement 60 with two wrapping devices (to the explained below),
- two ground-engaging wheels 41.*l*, 41.*r* for the bale forming device 40, and
- two further ground-engaging wheels 6.*l*, 6.*r* for the wrapping arrangement 60.

In the embodiment the bale forming device 40 of the baler-wrapper combination forms a sequence of round-cylindrical bales and operates as a continuous baler or as a non-stop baler. Such a continuous or non-stop baler can continue to pick-up crop material while the circumferential surface of the bale in the bale forming chamber is wrapped.

A continuous round baler comprises a wrapping chamber. This wrapping chamber is positioned behind the bale forming chamber—seen in the travelling direction TD. The bale is entirely formed in the bale forming chamber. As soon as the diameter of the bale in the bale forming chamber reaches a given threshold, the bale is moved from the bale forming chamber into the wrapping chamber. In the wrapping chamber the circumferential surface of the bale is wrapped. Simultaneously the formation of a further bale in the bale forming chamber is started. Such a continuous baler is disclosed in WO 2013/157949 A1, e.g.

A non-stop baler comprises a buffering chamber which is positioned between the pick-up unit and the bale forming chamber. Crop material is guided through the buffering chamber into the bale forming chamber. The bale is formed and is wrapped in the bale forming chamber. As long as the circumferential surface of the bale in the bale forming chamber is wrapped, crop material remains in the buffering chamber. Such a non-stop baler is disclosed in EP 2281436 A1 and in WO 2013/014291 A1, e.g.

A further approach is to use a baler with two bale forming chambers. Crop material is selectively guided into a first bale forming chamber or into a second bale forming chamber. Such a baler with two bale forming chambers is disclosed in DE 3248066 A1, e.g.

The invention can also be used for a baler-wrapper combination with a conventional round baler or a cuboid baler and a wrapper. The baler forms and wraps a bale entirely in the same chamber and does not process crop material while the circumferential surface of the bale is wrapped. This combination is stopped while the surface of the bale in the bale forming chamber is wrapped.

In the embodiment the baler-wrapper combination comprises
- a bale forming device (baler 40) and
- a wrapping arrangement 60 with two wrapping devices, namely a left and a right wrapping device.

Figure 2:
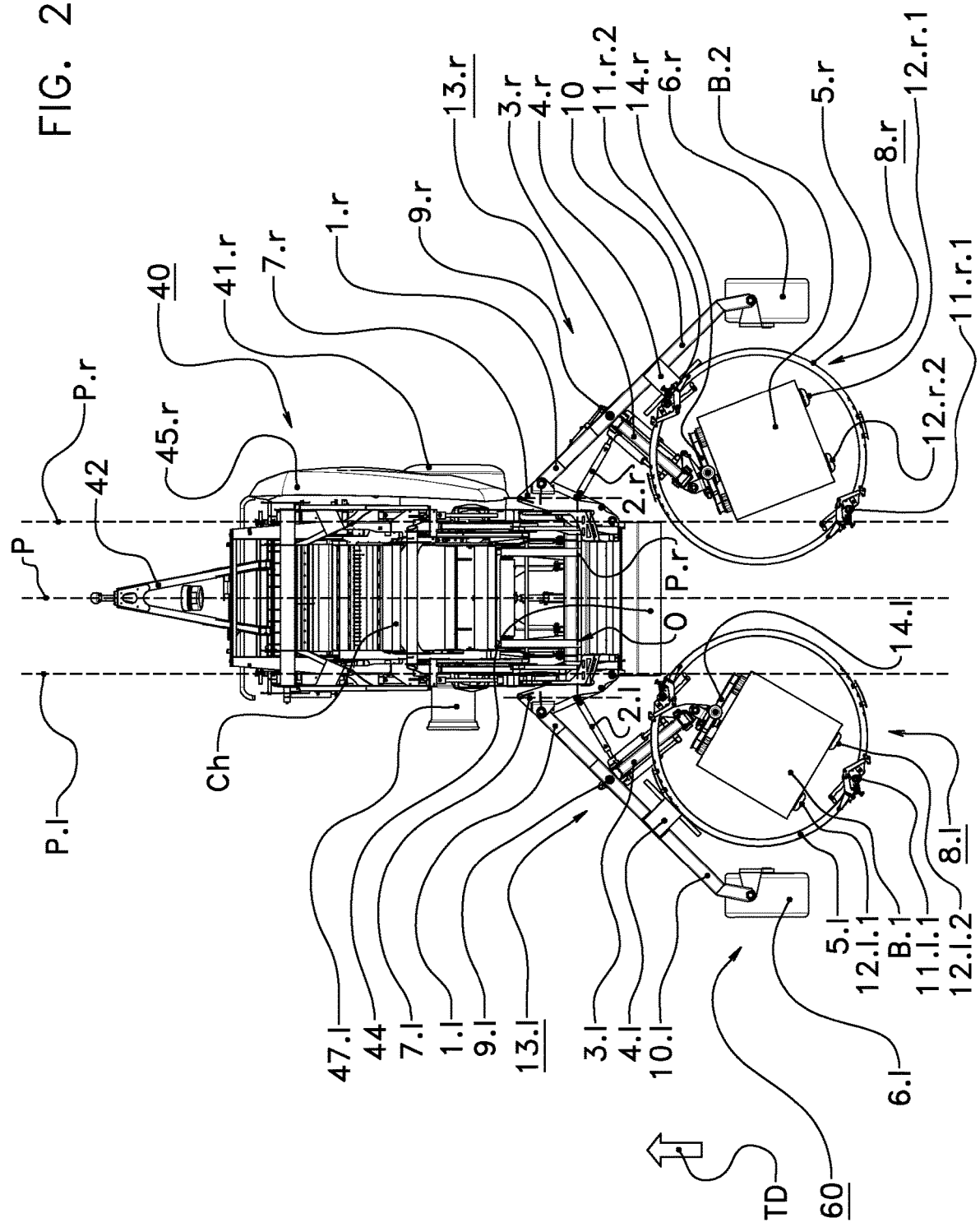
FIG. 2 is a top view of the baler-wrapper combination with both bale supports being in the lateral bale depositing position.
Figure 3:
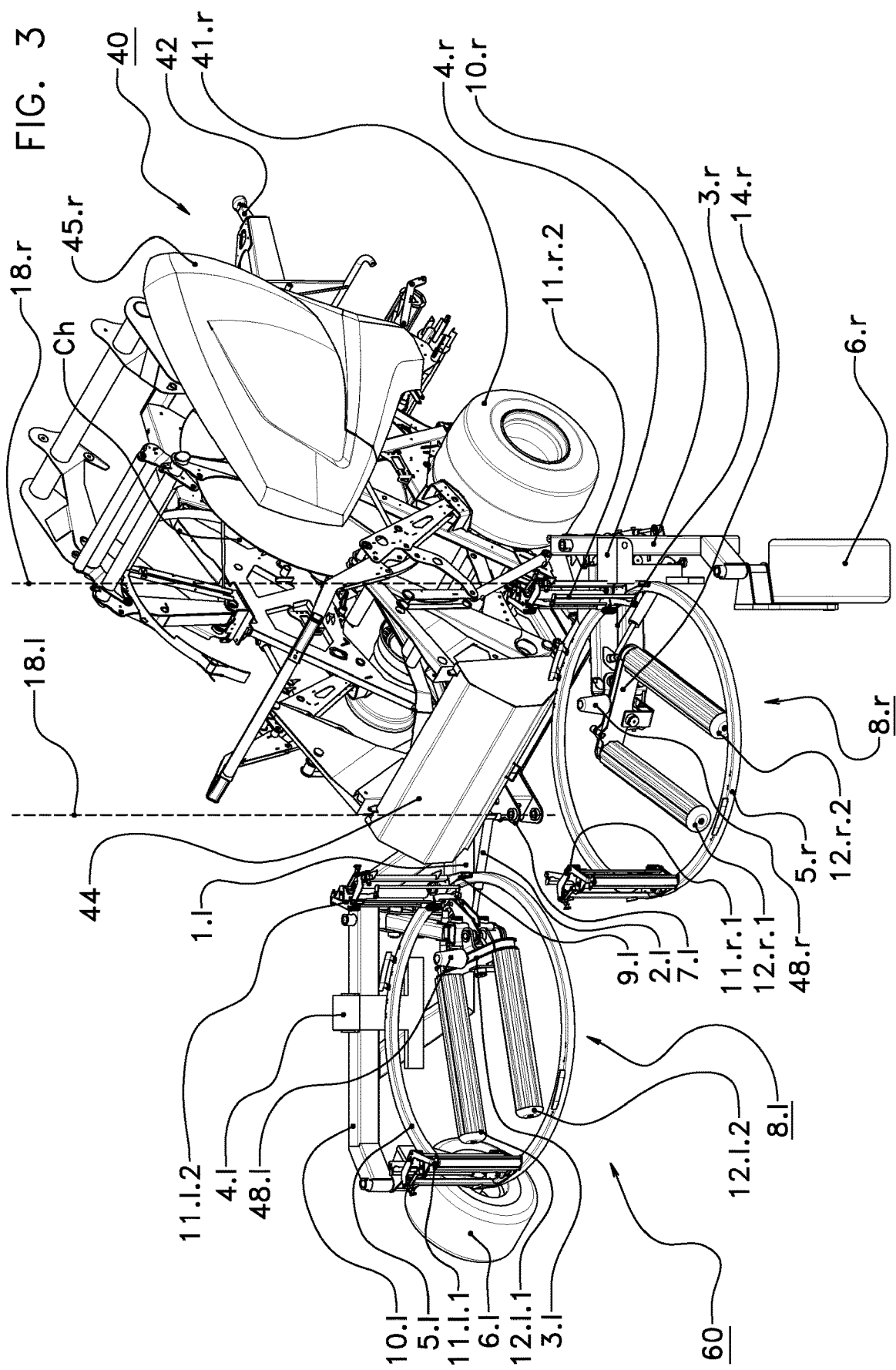
FIG. 3 shows the baler-wrapper combination of FIG. 2 in a horizontal viewing direction.

The terms "left" and "right" refer to the travelling direction TD. FIG. 2 and FIG. 3 show this baler-wrapper combination
- in a top view (FIG. 2) and
- in a perspective view from the right (FIG. 3).

The round baler 40 provides a drum-shaped bale forming chamber Ch. The circumferential surface of this chamber Ch is surrounded by a segment of an endless pressing belt. Two disks form the lateral sidewalls of this chamber Ch. A right disk 46.*r* can be seen in FIG. 3. Such a baler with two disks is described in WO 2013/157949 A1, e.g.

The round baler 40 is substantially symmetrical to a vertical center plane P. The bale forming chamber Ch is positioned between two vertical chamber planes P.l, P.r which are parallel to the vertical center plane P. In the embodiment these chamber planes P.l, P.r are provided by the two planes in which the disks extend.

FIG. 2 and FIG. 3 further show
- the towing unit 42,
- a discharge gate (tailgate 44) which can be pivoted between a closed bale forming position (FIG. 3) and an opened bale ejecting position,
- a right ground-engaging wheel 41.*r* of the baler 40, and
- a right pivotal cover 45.*r*, whereas the left cover 45.*l* and the left ground-engaging wheel 41.*l* are not shown.

The left wrapping device comprises a left wrapper 8.*l* and a left wrapper carrying device 13.*l*. The right wrapping device comprises a right wrapper 8.*r* and a right wrapper carrying device 13.*r*. The terms "left" and "right" refer to the travelling direction TD of the baler-wrapper combination over ground. In FIG. 2 the travelling direction TD is from bottom to top, in FIG. 3 from left to right.

Every wrapper 8.*l*, 8.*r* of the embodiment comprises
- a wrapping ring 5.*l*, 5.*r*,
- two film roll holders 11.*l*.1, 11.*l*.2 or 11.*r*.1, 11.*r*.2,
- a ring mover 4.*l*, 4.*r* for holding and rotating and tilting the wrapping ring 5.*l*, 5.*r*,
- two driven bale carrying rollers 12.*l*.1, 12.*l*.2 and 12.*r*.1, 12.*r*.2,
- a roller carrier 14.*l*, 14.*r* which rotatably carries the rollers 12.*l*.1, 12.*l*.2 and 12.*r*.1, 12.*r*.2,
- a roller drive (not shown) for rotating the bale carrying rollers 12.*l*.1, 12.*l*.2 and 12.*r*.1, 12.*r*.2 with respect to the roller carrier 14.*l*, 14.*r*, and
- a rotatable bobbin 48.*l*, 48.*r*.

Every wrapper carrying device 13.*l*, 13.*r* comprises
- a connecting member 7.*l*, 7.*r*,
- an inner carrying arm 1.*l*, 1.*r*,
- a cantilever arm 10.*l*, 10.*r*,
- a ground-engaging wheel 6.*l*, 6.*r* mounted on a wheel rim 47.*l*, 47.*r*,
- a single-wheel carrier 27.*l*, 27.*r* for the wheel 6.*l*, 6.*r*,
- a wrapper carrying arm 3.*l*, 3.*r*, and
- a horizontal hydraulic piston-cylinder unit 2.*l*, 2.*r*.

Every film roll holder 11.*l*.1, 11.*l*.2 or 11.*r*.1, 11.*r*.2 serves as a holding device and is mounted on the respective wrapping ring 5.*l*, 5.*r* and can carry one film roll serving as a wrapping material reservoir. An empty film roll can be replaced with a new film roll. When being kept in the film roll holder 11.*l*.1, 11.*l*.2, 11.*r*.1, 11.*r*.2, the film roll can rotate such that a web of plastic film can be pulled from the film roll holder 11.*l*.1, 11.*l*.2 or 11.*r*.1, 11.*r*.2. The middle axis of the film roll is vertical. The roller carrier 14.*l*, 14.*r* and the two bale carrying rollers 12.*l*.1, 12.*l*.2 or 12.*r*.1, 12.*r*.2 together form a bale support which is adapted for carrying and rotating a bale to be wrapped. The center axis of the carried bale is parallel to the axes of the bale carrying rollers 12.*l*.1, 12.*l*.2 or 12.*r*.1, 12.*r*.2.

Figure 4:
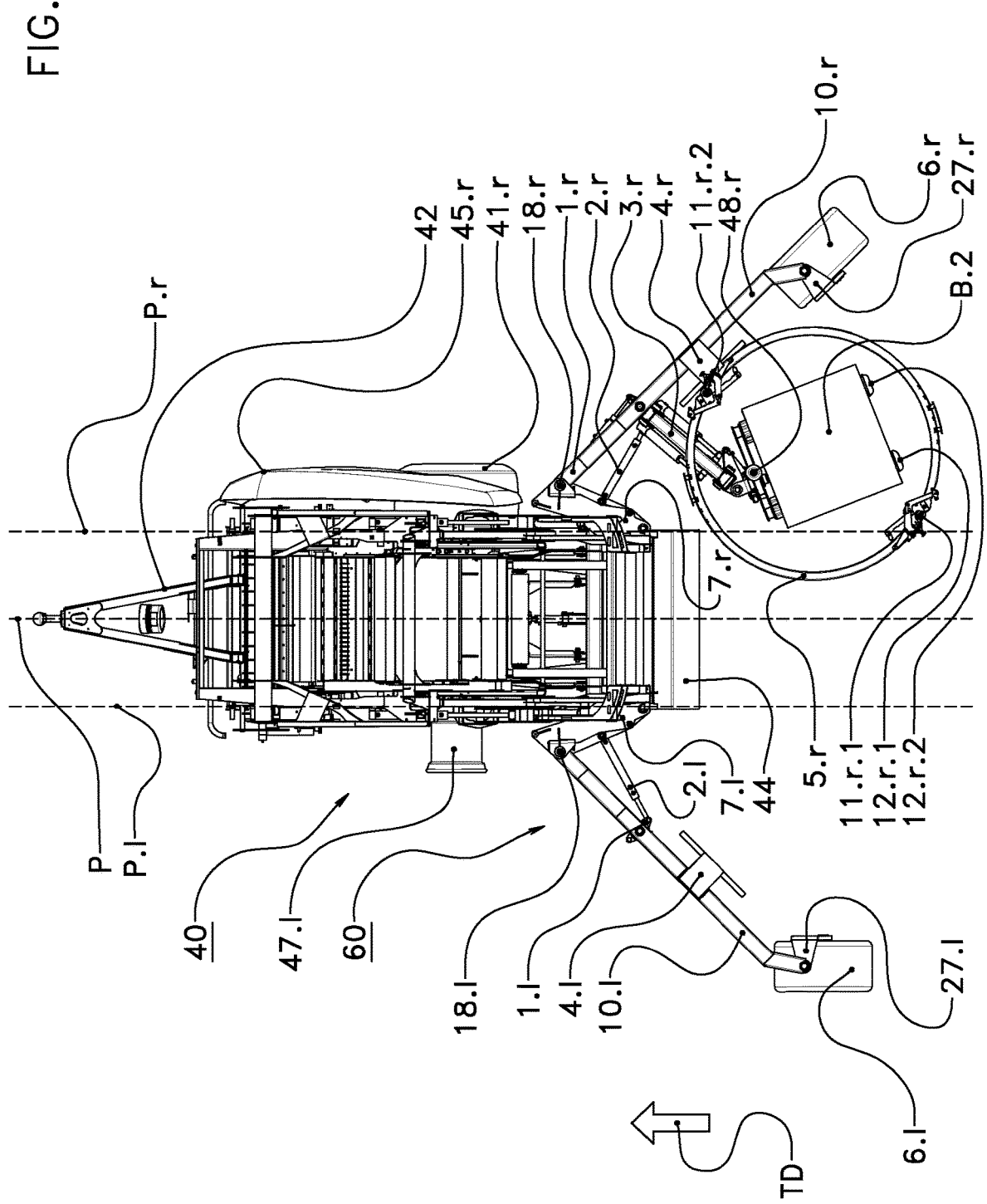
FIG. 4 to FIG. 8 show a slightly differing implementation of the baler-wrapper in different viewing directions.
Figure 5:
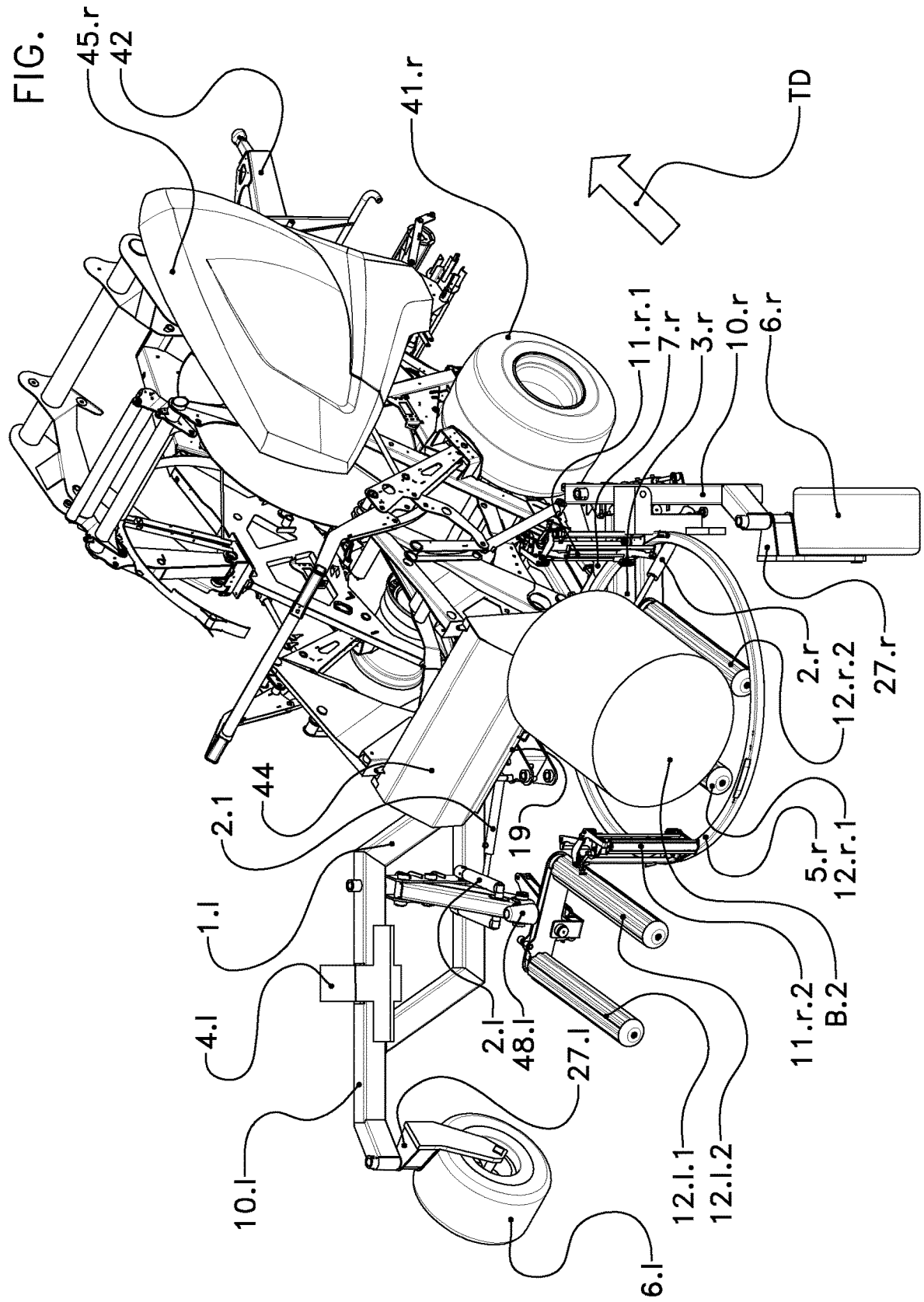
Figure 6:
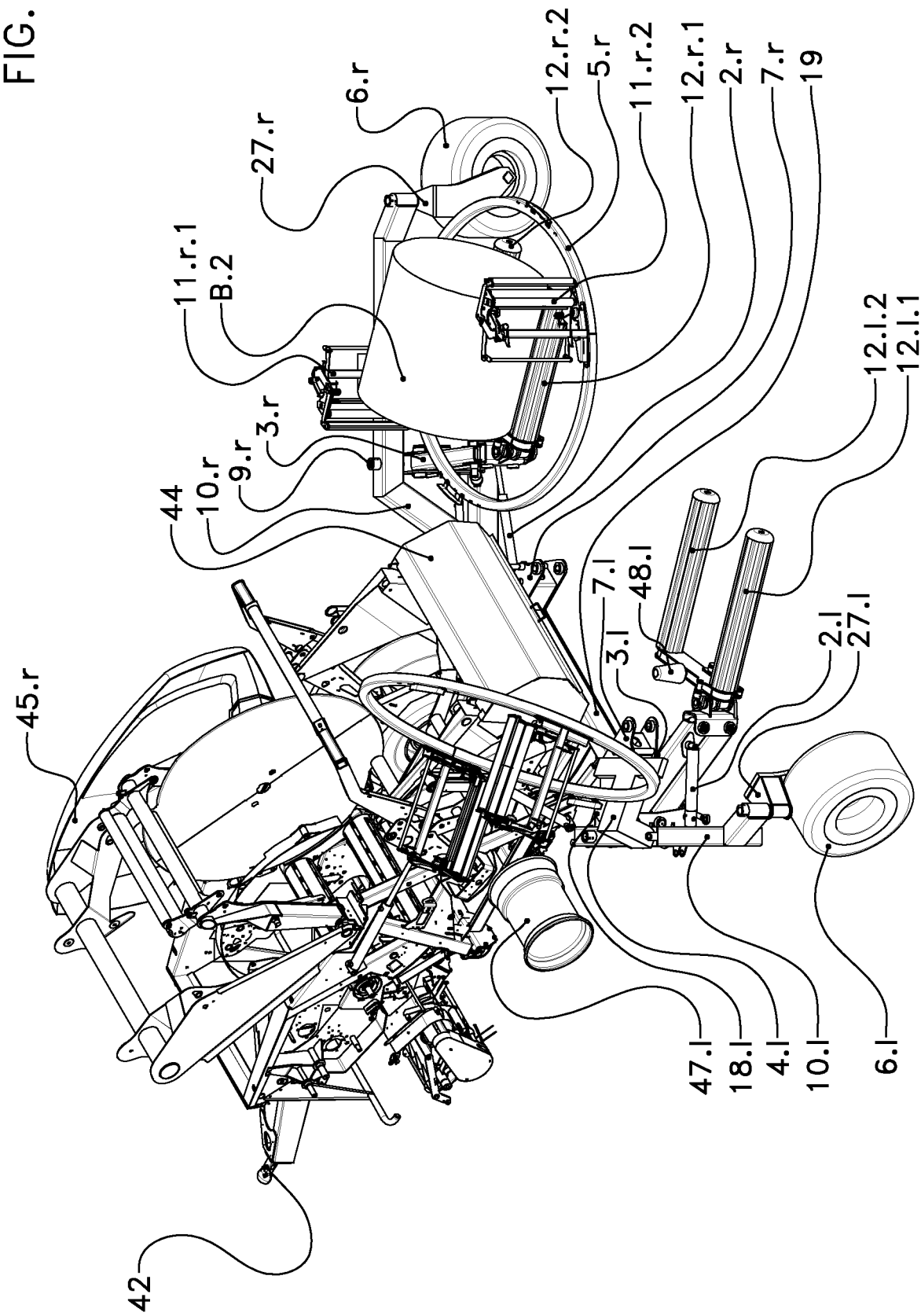
Figure 7:
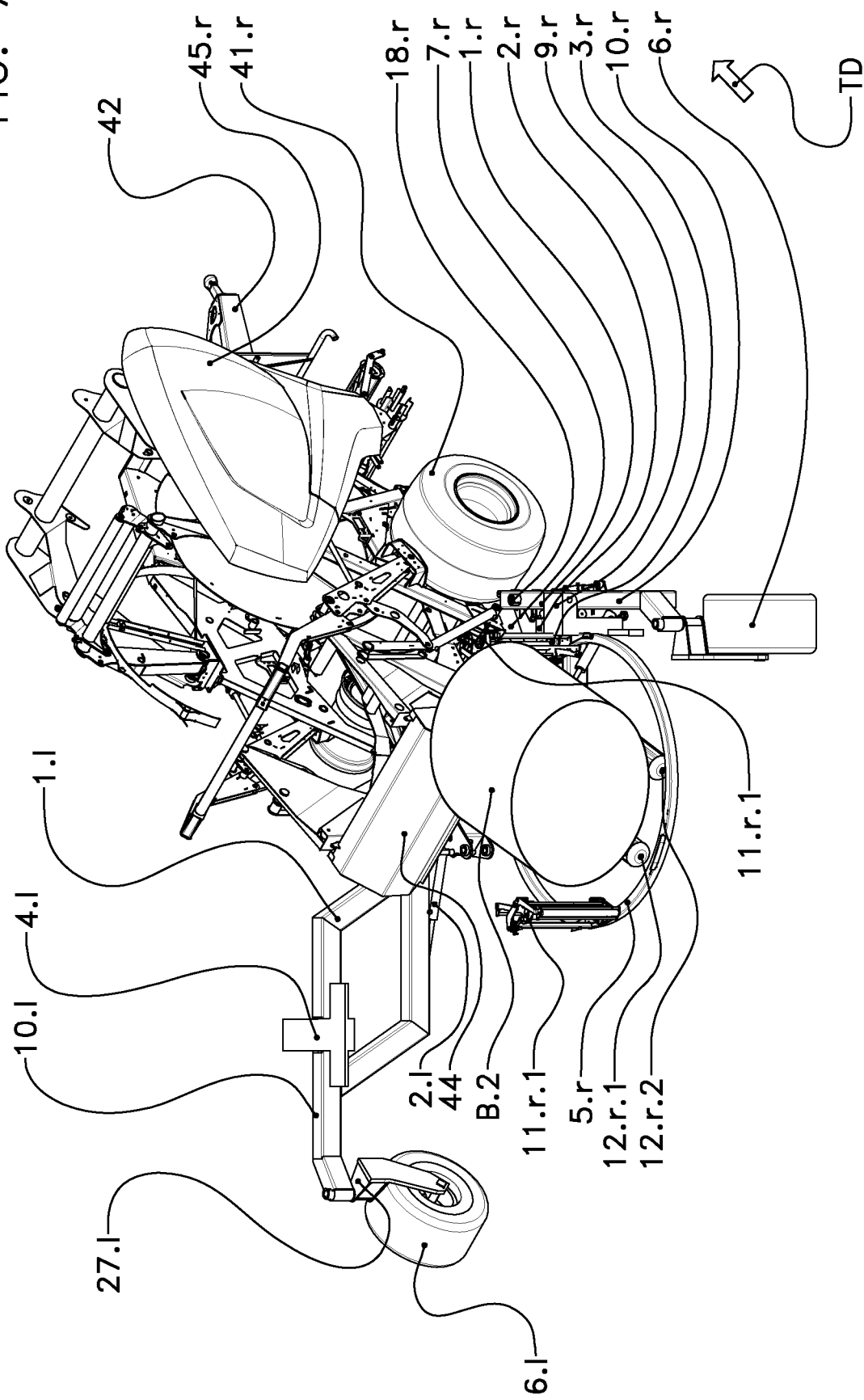
Figure 8:
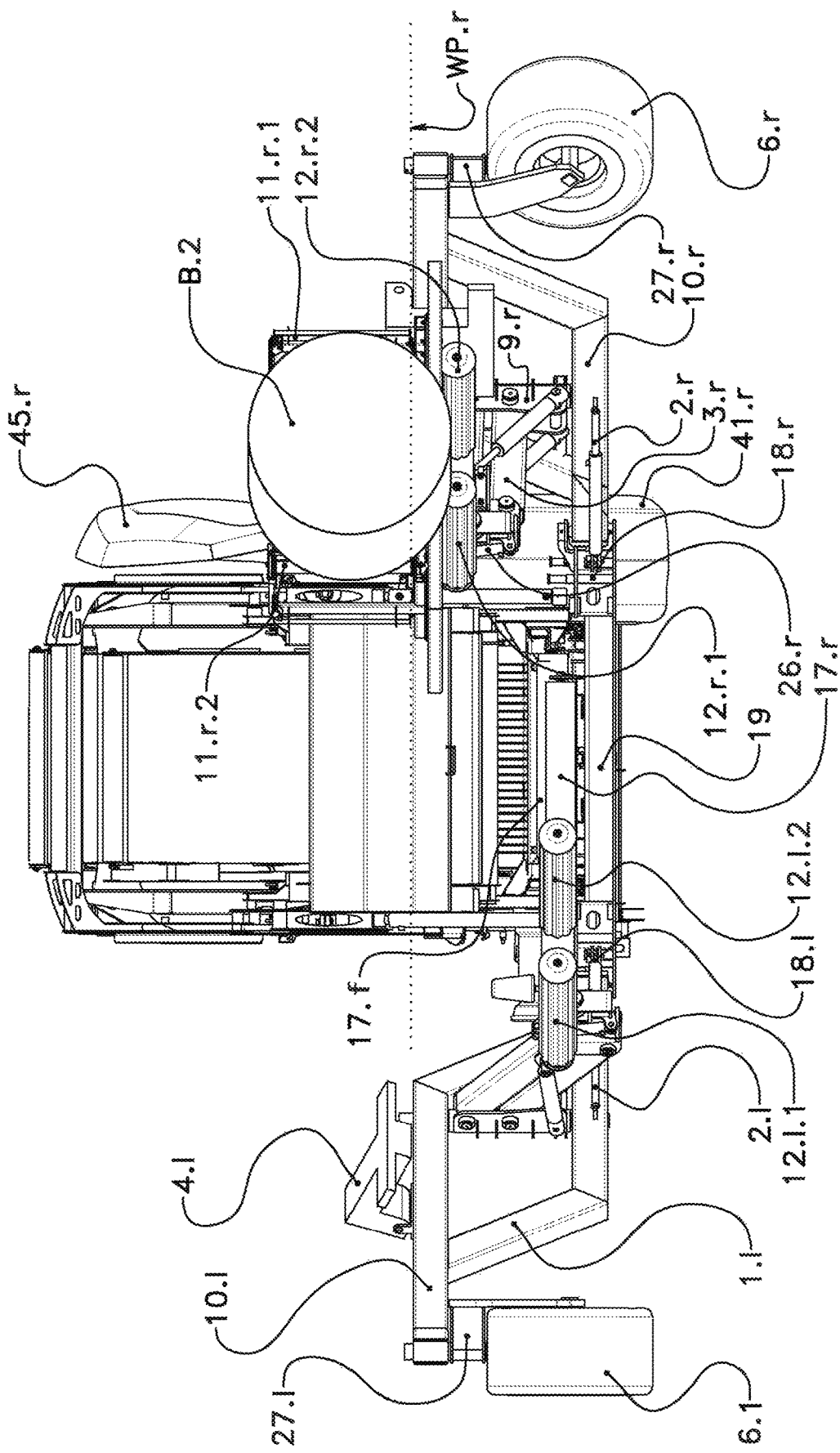

The ring mover 4.*l*, 4.*r* is mounted at the cantilever arm 10.*l*, 10.*r* and carries and can rotate the wrapping ring 5.*l*, 5.*r* with respect to the bale support 14.*l*, 14.*r*, 12.*l*.1, 12.*l*.2, 12.*r*.1, 12.*r*.2 around a vertical axis which is perpendicular to the drawing plane of FIG. 1 and of FIG. 4. FIG. 8 shows the horizontal wrapper plane WP.r in which the right wrapping ring 8.*r* can be moved. In one embodiment the ring mover 4.*l*, can further tilt the wrapping ring 5.*l*, 5.*r* with respect to the bale support 14.*l*, 14.*r*, 12.*l*.1, 12.*l*.2, 12.*r*.1, 12.*r*.2 around a horizontal tilting axis between
  a bale receiving position and
  a bale wrapping position.

In place of a wrapping ring 5.*l*, 5.*r* carrying two film roll holders it is also possible to provide two holder arms which are mounted at a vertical shaft above the bale support and which carry at their lower ends to film roll holders. Of course only one holder in place of two film roll holders can be used. It is further possible that a stationary film roll holder is used.

The wrapper carrying arm 3.*l*, 3.*r* carries the roller carrier 14.*l*, 14.*r* for the bale carrying rollers 12.*l*.1, 12.*l*.2, 12.*r*.1, 12.*r*.2 and thereby the bale support of this wrapping device. The connecting member 7.*l*, 7.*r* is rigidly connected with the baler 40. The inner carrying arm 1.*l*, 1.*r* is mounted at the connecting member 7.*l*, 7.*r*. The inner end of the cantilever arm 10.*l*, 10.*r* is connected with the outer end of the inner carrying arm 1.*l*, 1.*r* in an element 9.*l*, 9.*r*. The single-wheel carrier 27.*l*, 27.*r* is mounted at the free end of the cantilever arm 10.*l*, 10.*r*, cf. FIG. 4 to FIG. 8. The ground-engaging wheel 6.*l*, 6.*r* is rotatably mounted at the carrier 27.*l*, 27.*r*. In the embodiment the entire left wrapper carrying device 13.*l* is entirely situated in a position left of the left chamber plane P.l. The right wrapper carrying device 13.*r* is entirely positioned right of the right chamber plane P.r, cf. FIG. 4.

In one embodiment the cantilever arm 10.*l*, 10.*r* is rigidly connected with the inner carrying arm 1.*l*, 1.*r* such that a through-going arm 1.*l*, 1.0.*l*, 1.*r*, 10.*r* is formed. A pivot 9.*l*, 9.*r* connects the wrapper carrying arm 3.*l*, 3.*r* with the inner carrying arm 1.*l*, 1.*r*. The wrapper carrying arm 3.*l*, 3.*r* can pivot with respect to the through-going arm 1.*l*, 1.*r*, 10.*l*, 10.*r* around a vertical pivoting axis running through these pivots 9.*l*, 9.*r*.

The horizontal hydraulic piston-cylinder unit 2.*l*, 2.*r* is pivotally connected with the connecting member 7.*l*, 7.*r* and with the wrapper carrying arm 3.*l*, 3.*r*, cf. FIG. 3 and FIG. 4. The piston-cylinder unit 2.*l*, 2.*r* can pivot the wrapper carrying arm 3.*l*, 3.*r* around a vertical wrapper pivoting axis running through the pivot 9.*l*, 9.*r*. Thereby the bale support 14.*l*, 14.*r*, 12.*l*.1, 12.*l*.2, 12.*r*.1, 12.*r*.2 and the wrapper carrying arm 3.*l*, 3.*r* can be pivoted with respect to the baler 40 between
  a centered bale receiving position and
  at least one lateral bale depositing position.

In the bale receiving position the bale support 14.*l*, 14.*r*, 12.*l*.1, 12.*l*.2, 12.*r*.1, 12.*r*.2 is positioned behind the baler 40 and preferably substantially between the planes P.l and P.r. The bale support 14.*l*, 14.*r*, 12.*l*.1, 12.*l*.2, 12.*r*.1, 12.*r*.2 can receive an ejected bale. The axes of the two bale carrying rollers 12.*l*.1, 12.*l*.2 and 12.*r*.1, 12.*r*.2 are perpendicular to the travelling direction TD.

In the embodiment the bale support 14.*l*, 14.*r*, 12.*l*.1, 12.*l*.2, 12.*r*.1, 12.*r*.2 being in the lateral bale depositing position is entirely positioned outside of the space between the chamber planes P.l, P.r and has therefore a lateral offset to the vertical center plane P of the baler 40. When a bale support 14.*l*, 14.*r*, 12.*l*.1, 12.*l*.2, 12.*r*.1, 12.*r*.2 is in the lateral bale depositing position, a lateral offset O.l, O.r between this bale support and the vertical center plane P occurs, cf. FIG. 2 and FIG. 4. The space behind the baler 40 and between the chamber planes P.l, P.r is free such that the other bale support 14.*r*, 14.*l*, 12.*r*.1, 12.*r*.2, 12.*l*.1, 12.*l*.2 can be pivoted into the bale receiving position and can receive a further bale. FIG. 2 and FIG. 4 show the lateral offset O.l, O.r as the distance between the bale support and the center plane P.

In the embodiment every bale support 14.*l*, 14.*r*, 12.*l*.1, 12.*l*.2, 12.*r*.1, 12.*r*.2 can be pivoted with respect to the wrapper carrying device 13.*l*, 13.*r* about an angle of approx. 45 degrees between the centered bale receiving position and the lateral bale depositing position. It is possible that the bale support can be pivoted into one lateral bale depositing position which is selected out of a number of possible bale depositing positions. The piston-cylinder unit 2.*l*, 2.*r* pivots the bale support around the axis 9.*l*, 9.*r* about a selected pivoting angle. Different strokes yield different bale depositing positions.

It is possible that the wrapper carrying device 13.*l*, 13.*r* can be pivoted between an operating position and a transport position. FIG. 1 and FIG. 2 show both wrapper carrying devices 13.*l*, 13.*r* being in the operating position. The bale support 14.*l*, 14.*r*, 12.*l*.1, 12.*l*.2, 12.*r*.1, 12.*r*.2 can only be pivoted between the bale receiving position and the or any bale depositing position when the wrapper carrying device 13.*l*, 13.*r* is in the operating position. In the transport position the distance between a ground-engaging wheel 6.*l*, 6.*r* and the vertical center plane P is significantly smaller and the baler-wrapper combination has a reduced width. Therefore the baler-wrapper combination with both wrapper carrying devices 13.*l*, 13.*r* being in the transport position can be moved over a public street.

In the embodiment just mentioned left and right through-going arms 1.*l*, 10.*l* or 1.*r*, 10.*r* are formed. In a further embodiment the cantilever arm 10.*l*, 10.*r* and the wrapper carrying arm 3.*l*, 3.*r* can jointly or individually pivot with respect to the inner carrying arm 1.*l*, 1.*r*. The bale depositing position can automatically be selected depending on the weight of a bale on a bale support, of a bale in the bale forming chamber, or on the ground inclination, e.g. The piston-cylinder unit 2.*l*, 2.*r* can pivot the cantilever arm 10.*l*, 10.*r* together with the wrapper carrying arm 3.*l*, 3.*r* around the vertical pivoting axis through the pivot 9.*l*, 9.*r*.

In yet a further embodiment the inner arm 1.*l*, 1.*r* is pivotally connected with the connecting member 7.*l*, 7.*r*. Therefore it can pivot with respect to the baler 40 around a vertical pivoting axis 18.*l*, 18.*r* running through the connecting member 7.*l*, 7.*r*. The cantilever arm 10.*l*, 10.*r* is in the embodiment rigidly or pivotally connected with the inner carrying arm 1.*l*, 1.*r*. The piston-cylinder unit 2.*l*, 2.*r* can pivot the inner arm 1.*l*, 1.*r*, the cantilever arm 10.*l*, 10.*r*, and the wrapper carrying arm 3.*l*, 3.*r* around the vertical pivoting axis 18.*l*, 18.*r*. This pivotal movement can be performed for pivoting the bale support 14.*l*, 14.*r*, 12.*l*.1, 12.*l*.2 into the bale depositing position or into the bale receiving position.

It is also possible that this pivotal movement is only performed for pivoting the arms 1.*l*, 1.*r*, 10.*l*, 10.*r* and the wrapper carrying arm 3.*l*, 3.*r* between an operating position (shown in FIG. 1 and FIG. 2) and the transport position in which the baler-wrapper combination has a reduced width.

FIG. 4 to FIG. 8 show a further implementation of the embodiment in different viewing directions. These figures show two different implementations for the wrapper carrying devices 13.*l*, 13.*r*, namely one implementation for the left carrying device 13.*l* and one for the right carrying device 13.r. The left cover plate and the left ground-engaging wheel 41.l are omitted in the figures.

The left cantilever arm 10.l consists of three segments mounted in a sequence wherein two adjacent segments are angularly and rigidly connected with each other and have different heights over ground. The left wrapping ring 5.l, the left bale support and the left wrapper carrying arm 3.l are omitted in FIG. 4 to FIG. 8.

The right cantilever arm 10.r is implemented in a different way than the left cantilever arm 10.l and comprises several segments which are rigidly connected with each other and which form a parallelogram. The pivot 9.r is mounted at this parallelogram, cf. FIG. 6 and FIG. 8.

In the embodiment of FIG. 1 and FIG. 2 the wrapping arrangement 60 simultaneously carries two bales B.1 and B.2. These bales B.1, B.2 have subsequently been formed in the bale forming chamber Ch. The baler-wrapper combination according to the embodiment operates as follows:

The baler 40 forms a bale B.1, B.2 in the bale forming chamber Ch and wraps the circumferential surface of the bale while the bale is still in the bale forming chamber Ch.

The tailgate 44 is opened and the formed and partially wrapped bale is ejected out of the bale forming chamber Ch. The ejected bale rolls over a front transfer roller 17.f and subsequently over a rear bale transfer roller 17.r, cf. FIG. 8.

When the tailgate 44 is opened, the bale support of one bale wrapper 8.1 or 8.r is in the bale receiving position in a center position behind the tailgate 44. The bale carrying rollers 12.l.1, 12.l.2 or 12.r.l, 12.r.2 of the bale support being in the bale receiving position are perpendicular to the travelling direction TD. The bale support of the other wrapper 8.r or 8.l is in the lateral bale depositing position.

The ejected bale B.1, B.2 drops on the bale supporting rollers of that bale support which is in the bale receiving position.

The piston-cylinder unit 2.l or 2.r pivots the bale support carrying the ejected bale away from the tailgate 44 into the selected lateral bale depositing position as shown in FIG. 1 and FIG. 2. Preferably the bale support and the bale are now entirely outside of the space between the chamber planes P.l, P.r.

The ring mover 4.l or 4.r rotates the wrapping ring 5.l or 5.r of the bale support being in the lateral bale depositing position in the wrapper plane WP.l or WP.r around a vertical rotating axis. Two webs of plastic film are pulled from the film rolls which are held by the film roll holders 11.l.1, 11.l.2 or 11.r.l, 11.r.2 mounted on the rotated wrapping ring 5.l, 5.r.

In addition the bale carrying rollers 1.l.1, 1.l.2 or 1.r.l, 1.r.2 rotate the round-cylindrical bale on the bale support around the bale's center axis.

Thanks to these two superimposed movements the entire surface of the bale on the rotated bale support is wrapped into two plastic films.

As soon as the required number of film layers is placed around the bale, the films are kept and severed by two clamping and cutting devices (not shown).

The bale support is tilted around a horizontal pivoting axis. The wrapped bale B.1, B.2 rolls on the ground.

While the bale on the bale support being in the lateral bale depositing position is wrapped, the baler 40 forms a further bale and wraps its circumferential surface. As soon as or even before the further bale is readily formed and partially wrapped, the bale support of the other wrapper 8.r or 8.l is pivoted into the bale receiving position. The further bale is ejected out of the bale forming chamber Ch and rolls onto the bale support of the other wrapper 8.r, 8.l.

The further bale is wrapped in the same way by the other wrapping device.

In one embodiment a bale is deposited as soon as the entire surface of this bale is wrapped into the required number of plastic film layers and the bale-wrapper combination reaches a suitable depositing location. In a further embodiment at least one s cluster comprising two or even three wrapped bales is formed on the ground. The first bale is kept on the bale support of the first wrapper 8.l or 8.r until the further bale is radially wrapped by the other wrapper 8.r or 8.l. If the further bale is readily wrapped and the baler-wrapper combination reaches a suitable depositing location, both bales are deposited simultaneously on the ground.

Reference signs used in the claims will not limit the scope of the claimed invention. The term "comprises" does not exclude other elements or steps. The articles "a", "an", and "one" do not exclude a plurality of elements. Features specified in several depending claims may be combined in an advantageous manner.

The invention claimed is:

1. A baler-wrapper combination comprising:
a bale forming device providing a bale forming chamber;
a left wrapping device with a left moveable support being moveable between a left bale receiving position and at least one left lateral bale depositing position;
a right wrapping device with a right moveable support being moveable between a right bale receiving position and at least one right lateral bale depositing position;
a left wrapper moving actuator and a right wrapper moving actuator,
wherein each of the left and the right wrapping devices is mechanically connected with the bale forming device,
wherein each wrapping device is arranged such that when the corresponding left or right moveable support is in the corresponding left or right bale receiving position, the corresponding support is centered with respect to a vertical center plane extending in a longitudinal direction of the bale forming device,
wherein the bale forming device is arranged to form a bale in the bale forming chamber and to eject the formed bale out of the bale forming chamber,
wherein the baler-wrapper combination is arranged to move said ejected bale onto the left or the right moveable support in the corresponding left or right bale receiving position,
wherein each of the left and the right wrapping devices is arranged to wrap the bale carried on the corresponding left or right support of the wrapping device with at least one web, and to remove the wrapped bale from the corresponding support in the at least one corresponding left or right lateral bale depositing position, thereby depositing the wrapped bale at a location outside of the baler-wrapper combination,
wherein each of the left and the right wrapper moving actuators is arranged to move the corresponding left or right moveable support together with the carded bale from the corresponding left or right bale receiving position into the at least one corresponding left or right bale depositing position,
wherein each of the left and the right wrapping devices is arranged such that when the corresponding left or right moveable support is in the at least one corresponding left or right lateral bale depositing position, the corresponding support has a lateral offset to the vertical center plane such that the corresponding support and the carried ejected bale are entirely on the same side of the vertical center plane when the corresponding support is in the lateral bale depositing position, and wherein the corresponding left or right wrapper moving actuator is arranged to move the corresponding left or right moveable support together with the carried bale into the corresponding left or right lateral bale depositing position.

2. The baler-wrapper combination according to claim 1, wherein at least one of the left and the right moveable supports is pivotal with respect to the bale forming device around a corresponding left or right vertical wrapper pivoting axis between the corresponding left or right bale receiving position and the at least one corresponding left or right lateral bale depositing position, wherein at least one of the left and the right wrapper moving actuators is arranged to pivot the corresponding left or right pivotal, moveable support together with the carried bale around the corresponding left or right vertical wrapper pivoting axis from the corresponding left or right bale receiving position into the at least one corresponding left or right lateral bale depositing position.

3. The baler-wrapper combination according to claim 2, wherein a pivoting angle of 45 degrees occurs between the corresponding left or right bale receiving position and the at least one corresponding left or right lateral bale depositing position of the at least one corresponding left or right moveable support.

4. The baler-wrapper combination according to claim 2, wherein at least one of the left and right vertical wrapper pivoting axis has a lateral offset to the vertical center plane of the bale forming device.

5. The baler-wrapper combination according to claim 2, wherein the bale forming chamber extends between two parallel chamber planes both being parallel to the vertical center plane, wherein at least one of the left and right vertical wrapper pivoting axis is positioned outside of a space between the two parallel chamber planes.

6. The baler-wrapper combination according to claim 1, wherein at least one of the left and the right moveable supports is shiftable with respect to the bale forming device in a shifting direction from the corresponding left or right bale receiving position into the at least one corresponding left or right lateral bale depositing position, wherein the shifting direction is perpendicular or angular to the vertical center plane of the bale forming device, and wherein at least one of the left and the right wrapper moving actuators is arranged to shift the at least one of the moveable supports together with a carried bale in the shifting direction from the corresponding left or right bale receiving position into the at least one corresponding left or right lateral bale depositing position.

7. The baler-wrapper combination according to claim 1, wherein the left moveable support of the left wrapping device is pivotable with respect to the bale forming device around a left vertical wrapper pivoting axis between the left bale receiving position and the at least one left lateral bale depositing position, wherein the right moveable support of the right wrapping device is pivotable with respect to the bale forming device around a right vertical wrapper pivoting axis between the right bale receiving position and the at least one right lateral bale depositing position, wherein a horizontal distance between the left and the right vertical wrapper pivoting axes occurs, and wherein the vertical center plane is positioned between the left vertical wrapper pivoting axis and the right vertical wrapper pivoting axis.

8. The baler-wrapper combination according to claim 1, wherein at least one of the left and the right wrapping devices comprises:

a corresponding left or right wrapper carrying device, mounted at the bale forming device and moveably mounted to the corresponding left or right moveable support of the at least one wrapping device, wherein at least one of the left and the right wrapper moving actuators is arranged to move the corresponding left or right moveable support with respect to the corresponding left or right wrapper carrying device from the corresponding left or right bale receiving position into the at least one corresponding left or right lateral depositing position.

9. The baler-wrapper combination according to claim 8, wherein at least one of the left and the right wrapping devices comprises at least one ground-engaging wheel which is rotatably mounted at the corresponding left or right wrapper carrying device.

10. The baler-wrapper combination according to claim 8, wherein the corresponding left or right moveable support of the at least one wrapping device is at least partially positioned between the corresponding wrapper carrying device of the at least one wrapping device and the vertical center plane when the corresponding left or right moveable support is in the at least one corresponding left or right lateral bale depositing position.

11. The baler-wrapper combination according to claim 8, wherein at least one of the corresponding left or right wrapper carrying devices comprises:

a wrapper carrying arm; and a wrapper carrier, wherein the corresponding left or right moveable support of the at least one wrapping device is mounted at the wrapper carrier.

12. The baler-wrapper combination according to claim 11, wherein the wrapper carrier of the at least one of the corresponding left or right wrapper carrying devices is pivotable with respect to the corresponding wrapper carrying arm around a vertical pivoting axis, thereby providing a pivotal arrangement of the corresponding moveable support between the corresponding bale receiving position and the corresponding at least one lateral bale depositing position.

13. The baler-wrapper combination according to claim 1, wherein the baler-wrapper combination is arranged to eject the formed bale out of the bale forming chamber and deposit the bale at the location outside of the baler-wrapper combination when the left or right moveable support of the corresponding left or right wrapping device is in the at least one corresponding left or right lateral bale depositing position, thereby moving said bale along the corresponding wrapping device.

14. The baler-wrapper combination according to claim 1, wherein at least one of the left and the right wrapping devices comprises at least one holding device for holding at least one web of wrapping material, wherein said at least one wrapping device is arranged to move the at least one holding device relative to the bale carried by the support of said at least one wrapping device, thereby causing the carried bale to be wrapped with at least one web held by the at least one holding device, wherein, the at least one wrapping device is further arranged such that the support and the holding device of the at least one wrapping device are entirely on the same side of the vertical center plane when the support is in the at least one lateral bale depositing position, wherein the left wrapping device comprises a left holding device and the left support is moveable between the left bale receiving position and the at least one left lateral bale depositing position; and wherein the right wrapping device comprises a right holding device and the right support is moveable between the right bale receiving position and the at least one right lateral bale depositing position, wherein the left support and the left holding device are entirely on the left side of the vertical center plane when the left support is in the at least one left lateral bale depositing position, and wherein the right support and the right holding device are entirely on the right side of the vertical center plane when the right support is in the at least one right lateral bale depositing position.

15. The baler-wrapper combination according to claim 1, further comprising:
a bale transfer support positioned between the bale forming device and at least one of the left and the right moveable supports in the corresponding left or right bale receiving position,
wherein the baler-wrapper combination is arranged to move the ejected bale over the bale transfer support and onto the at least one moveable support.

16. A method for forming and wrapping bales comprising:
using a baler-wrapper combination including a bale forming device with a bale forming chamber, a first and a further wrapping device, wherein the first and the further wrapping devices have a first and further support, respectively, for carrying a bale, and a first and further wrapper moving actuator associated with the respective wrapping device, wherein each wrapping device is mechanically connected with the bale forming device, wherein the support of each wrapping device is moveable with respect to the bale forming device between a corresponding bale receiving position and corresponding at least one bale depositing position, wherein each wrapping device is arranged such that when the corresponding moveable support is in the corresponding bale receiving position the corresponding support is centered with respect to a vertical center plane extending in a longitudinal direction of the bale forming device;
forming a first bale in the bale forming chamber;
ejecting the formed bale out of the bale forming chamber;
moving the ejected bale onto the first moveable support in the corresponding bale receiving position;
triggering the first wrapper moving actuator to move the first moveable support carrying the ejected bale from the corresponding bale receiving position into the corresponding at least one bale depositing position such that the first moveable support in the corresponding at least one bale depositing position has a lateral offset with respect to the vertical center plane extending in the longitudinal direction of the bale forming device and such that the first moveable support and the carried ejected bale are entirely on the same side of the vertical center plane;
wrapping the carried ejected bale with at least one web of wrapping material;
removing the wrapped bale from the first support when the first support is in the corresponding at least one bale depositing position such that the wrapped bale is deposited at a location outside of the baler-wrapper combination;
forming a further bale in the bale forming chamber and ejecting the further bale out of the bale forming chamber;
moving the ejected further bale on the further support of the further wrapping device;
wrapping the further bale on the further support with at least one further web of wrapping material; and
wherein the moving of the ejected further bale onto the moveable further support of the further wrapping device occurs after the moveable first support is moved into the corresponding at least one lateral bale depositing position.

17. The method for forming and wrapping bales according to claim 16,
wherein ejecting the further bale out of the bale forming chamber occurs when the further moveable support is in the corresponding bale receiving position and further comprising depositing the wrapped further bale at the location outside of the baler-wrapper combination.

18. The method for forming and wrapping bales according to claim 16, further comprising:
moving the further moveable support carrying the further bale into the corresponding at least one lateral bale depositing position such that when the further moveable support is in the corresponding at least one lateral bale depositing position the further moveable support and the carried further bale are entirely on a same further side of the vertical center plane.

19. The method for forming and wrapping bales according to claim 16, further comprising:
wrapping the first or further bale on the corresponding first or further moveable support after the corresponding moveable support is moved into the corresponding at least one lateral bale depositing position.

20. The method for forming and wrapping bales according to claim 16, further comprising:
triggering the first or further wrapper moving actuator and moving the corresponding first or further moveable support carrying the first or further bale into the corresponding at least one lateral bale depositing position while the bale on the corresponding moveable support is being wrapped or alternatively, after the bale on the corresponding moveable support is entirely wrapped.

21. The method for forming and wrapping bales according to claim 16, further comprising:
when the bale forming device has formed the first or the further bale in the bale forming chamber, triggering the corresponding first or further wrapper moving actuator to move the corresponding first or further moveable support from the corresponding at least one lateral bale depositing position into the corresponding bale receiving position.

* * * * *